(12) United States Patent
Preuss et al.

(10) Patent No.: US 12,479,775 B2
(45) Date of Patent: Nov. 25, 2025

(54) CHEMICAL VAPOR INFILTRATION TOOLING FOR OPTIMIZING INFILTRATION IN CERAMIC MATRIX COMPOSITES

(71) Applicant: Raytheon Technologies Corporation, Farmington, CT (US)

(72) Inventors: Daniel P. Preuss, Glastonbury, CT (US); Andrew Joseph Lazur, La Jolla, CA (US); Brendan Lenz, Wethersfield, CT (US); Lane M. Thornton, Tolland, CT (US); Mary Colby, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 360 days.

(21) Appl. No.: 18/118,460

(22) Filed: Mar. 7, 2023

(65) Prior Publication Data

US 2024/0300863 A1   Sep. 12, 2024

(51) Int. Cl.
*C04B 41/45* (2006.01)

(52) U.S. Cl.
CPC ........ *C04B 41/4529* (2013.01); *C04B 41/457* (2013.01); *C04B 41/4584* (2013.01); *C04B 2235/614* (2013.01)

(58) Field of Classification Search
CPC .......... B28B 23/02–028; C04B 41/457; C04B 41/4531; C23C 16/45563; C23C 16/45565; C23C 2235/614; C23C 41/457; C23C 41/4531

See application file for complete search history.

(56) References Cited

U.S. PATENT DOCUMENTS

| 3,991,248 A | 11/1976 | Bauer |
| 4,909,914 A | 3/1990 | Chiba et al. |
| 5,217,755 A | 6/1993 | Thebault et al. |
| 8,845,806 B2 | 9/2014 | Aida et al. |

(Continued)

FOREIGN PATENT DOCUMENTS

| CN | 107266099 A | 10/2017 |
| CN | 115181959 A | 10/2022 |

(Continued)

OTHER PUBLICATIONS

Extended European Search Report for EP Application No. 24161794. 3, dated Oct. 11, 2024, 15 pages.

(Continued)

*Primary Examiner* — Tyrone V Hall, Jr.
(74) *Attorney, Agent, or Firm* — Kinney & Lange, P.A.

(57) ABSTRACT

A tooling fixture suitable for use in infiltrating a fibrous preform with a flow of reactant gas includes at least one wall. The at least one wall includes an outer surface and opposing inner surface defining a thickness therebetween, and a plurality of holes extending through the thickness. Each hole of the plurality of holes includes an inlet at the outer surface, an outlet at the inner surface, a transition point between the inlet and the outlet, and a first corner defined by the outer surface and the inlet. An angle of the first corner is less than 90 degrees, each hole of the plurality of holes has a first diameter at the inlet and a second diameter at the outlet, and the second diameter is less than the first diameter.

20 Claims, 5 Drawing Sheets

(56) References Cited

U.S. PATENT DOCUMENTS

| | | |
|---|---|---|
| 10,906,205 B2 | 2/2021 | Thibaud et al. |
| 10,906,842 B2 | 2/2021 | Shi et al. |
| 11,046,620 B2 | 6/2021 | Shim et al. |
| 11,332,827 B2 | 5/2022 | Agarwal et al. |
| 2001/0050059 A1 | 12/2001 | Hongo et al. |
| 2007/0079934 A1* | 4/2007 | Murata ............... C04B 41/009 156/914 |
| 2012/0097330 A1 | 4/2012 | Iyengar et al. |
| 2012/0103264 A1 | 5/2012 | Choi et al. |
| 2015/0214009 A1 | 7/2015 | Glukhoy |
| 2017/0114462 A1 | 4/2017 | Zhang et al. |
| 2018/0340257 A1 | 11/2018 | Achary et al. |
| 2020/0061868 A1 | 2/2020 | Thibaud et al. |
| 2020/0123066 A1 | 4/2020 | Shi et al. |
| 2020/0123067 A1 | 4/2020 | Freeman et al. |
| 2020/0308703 A1* | 10/2020 | Agarwal ........... C23C 16/45544 |
| 2022/0195606 A1 | 6/2022 | Borkowski et al. |
| 2023/0047104 A1 | 2/2023 | Parzefall |

FOREIGN PATENT DOCUMENTS

| | | |
|---|---|---|
| EP | 3805424 A1 | 4/2021 |
| JP | S58176196 A | 10/1983 |
| JP | 5093165 B2 | 9/2012 |
| JP | 7164632 B2 | 10/2022 |

OTHER PUBLICATIONS

Extended European Search Report for EP Application No. 24161861.0, dated Oct. 23, 2024, 15 pages.
Extended European Search Report for EP Application No. 24161857.8, dated Dec. 19, 2024, 13 pages.
Partial Search Report for EP Application No. 24161857.8, dated Jul. 17, 2024, 11 pages.

* cited by examiner

CHEMICAL VAPOR INFILTRATION TOOLING FOR OPTIMIZING INFILTRATION IN CERAMIC MATRIX COMPOSITES

BACKGROUND

The present invention relates to chemical vapor infiltration (CVI), and more particularly to improved tooling for CVI.

Ceramic matrix composite (CMC) parts are widely fabricated by applying an interface coating (IFC) to preforms made from woven fabrics or oriented/braided fiber tows. To keep the preforms in a rigid form and maintain proper shape and geometry, perforated tooling can be used to hold the preforms during the initial densification cycle(s). Holes in the tooling allow vaporous precursors to infiltrate into the preform for the deposition of a ceramic matrix. Tooling for simple preform shapes can be designed with uniform hole dimensions. When used with complexly-shaped preforms such as turbine airfoils, vaporous precursors may not sufficiently infiltrate the preform at certain locations through such holes. The result can be differential deposition rate and effective IFC thickness, which can drive differences in mechanical behavior and durability of the CMC part. Thus, a need exists for improved tooling.

SUMMARY

A tooling fixture suitable for use in infiltrating a fibrous preform with a flow of reactant gas includes at least one wall. The at least one wall includes an outer surface and opposing inner surface defining a thickness therebetween, and a plurality of holes extending through the thickness. Each hole of the plurality of holes includes an inlet at the outer surface, an outlet at the inner surface, a transition point between the inlet and the outlet, and a first corner defined by the outer surface and the inlet. An angle of the first corner is greater than 90 degrees, each hole of the plurality of holes has a first diameter at the inlet and a second diameter at the outlet, and the second diameter is less than the first diameter.

A tooling fixture suitable for use in infiltrating a fibrous preform with a flow of reactant gas includes at least one wall. The at least one wall includes an outer surface and opposing inner surface defining a thickness therebetween, and a plurality of holes extending through the thickness. Each hole of the plurality of holes includes an inlet at the outer surface, an outlet at the inner surface, a transition point between the inlet and the outlet, and a first corner defined by the outer surface and the inlet. An angle of the first corner is greater than 90 degrees.

Figure 1:
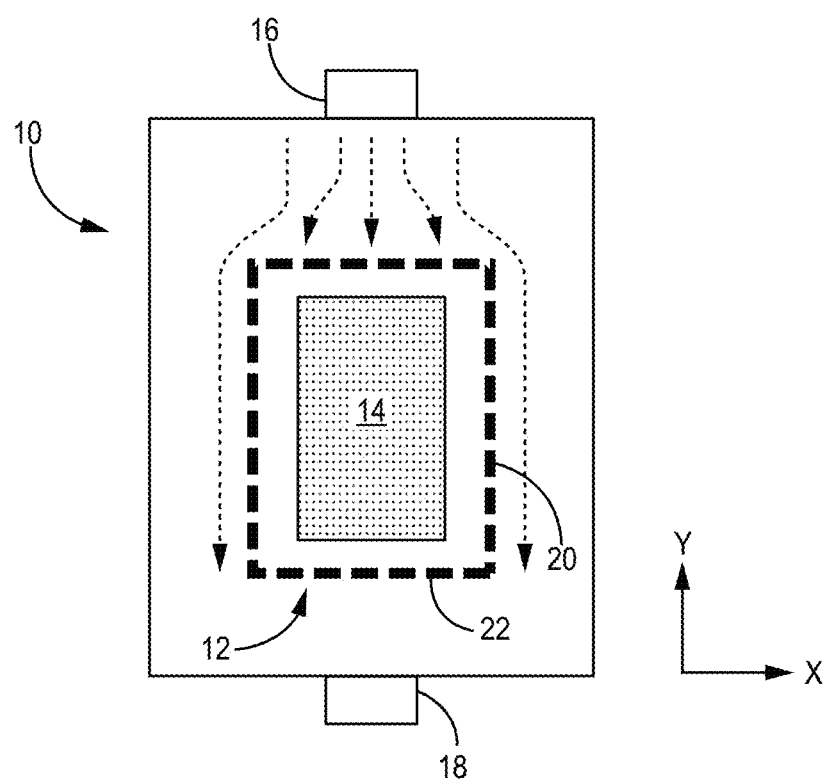
FIG. 1 is a simplified illustration of a tooling fixture within a CVI reactor.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents various inlet geometries for infiltration holes in a tooling fixture. More specifically, the inlets are widened and/or angled with respect to a flow of reactant gas based on the orientation of the tooling fixture within a CVI reactor. Such geometries minimize pressure losses and/or flow vortices to ensure sufficient flow volume through the holes.

FIG. 1 is a simplified illustration of tooling fixture 10 positioned with CVI reactor 12. Tooling fixture 10 is supporting preform 14. Tooling fixture 12 can, in an exemplary embodiment, be formed from graphite. In an alternative embodiment, tooling fixture 12 can be all or partially formed from refractory metal alloys, carbon-carbon composites, and/or a ceramic (e.g., silicon carbide, aluminum oxide, boron nitride, etc.). Preform 14 can be formed from tows of silicon carbide (SiC) or other ceramic fibers arranged in one of various two or three-dimensional woven architectures such as plain, harness (e.g., 3, 5, 8, etc.), twill, braid, or non-symmetric to name a few non-limiting examples. In an alternative embodiment, preform 14 can be formed from non-woven (e.g., chopped, felted, etc.) fibers. Tooling fixture 12 can at least partially surround preform 14 to help maintain the shape of preform 14 during CVI. Tooling fixture 12 and preform 14 can each include straight and/or curved segments depending on the geometry desired in the final CMC part.

CVI reactor 12 includes inlet 16 and outlet 18. A flow of reactant gas, represented by dashed arrows, can be introduced to CVI reactor 12 at inlet 16 and exhausted from CVI reactor 12 at outlet 18. This flow of reactant gas therefore travels primarily along the y-axis (i.e., flow axis). Tooling fixture 12 includes multiple walls/sides 20 with infiltration holes 22 extending therethrough. The uppermost side 20, proximate inlet 16 is disposed along the x-axis such that the flow of reactant gas is mostly normal to its surface, and parallel with its respective holes 22. For sides 20 disposed along the y-axis, however, holes 22 are essentially disposed at a right angle with respect to the flow of reactant gas, as is shown in greater detail in FIGS. 2A-2C.

For uniformly conical (i.e., straight-walled) holes, pressure loss and/or flow vortices at the hole's inlet caused by the turning of the flow into the inlet can at least partially block additional flow into the inlet, leading to insufficient flow of reactant gas through tooling fixture sides oriented in the flow direction. This can result in uneven IFC deposition on corresponding preform surfaces.

Figure 2A:
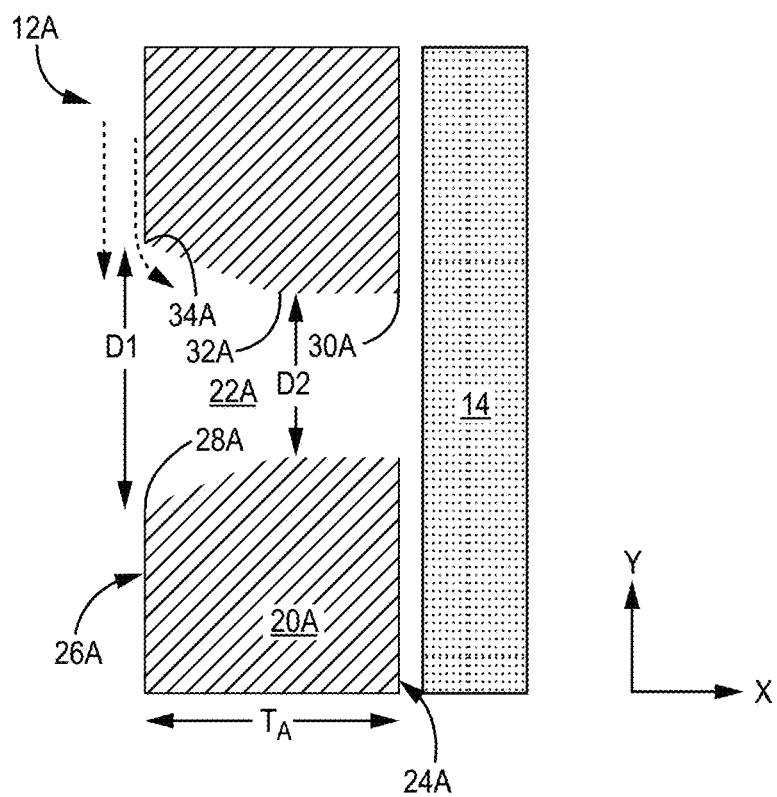
FIG. 2A is a simplified cross-sectional illustration of a tooling fixture with infiltration holes according to a first embodiment.
Figure 2B:
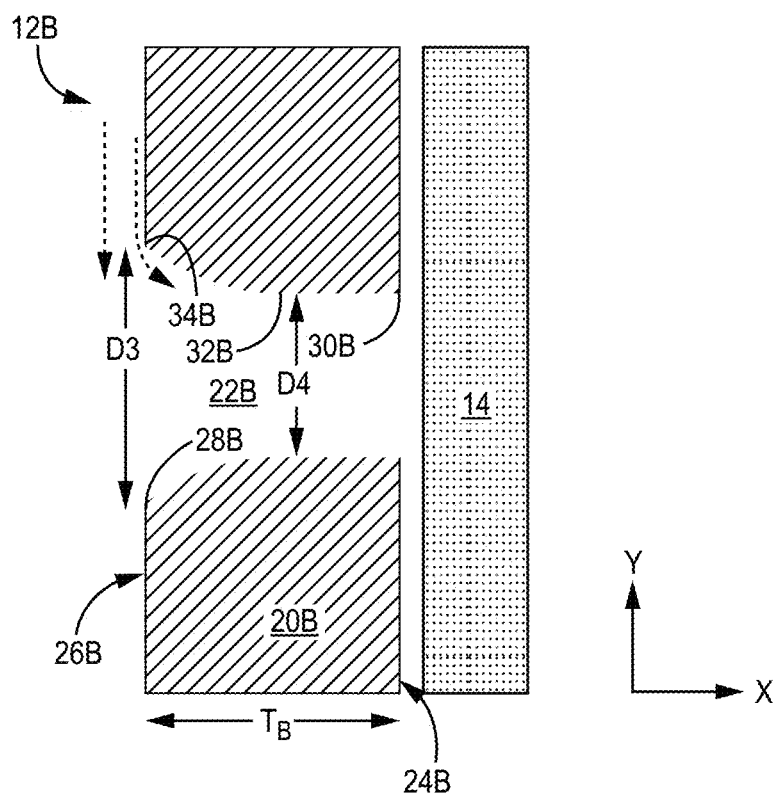
FIG. 2B is a simplified cross-sectional illustration of a tooling fixture with infiltration holes according to a second embodiment.
Figure 2C:
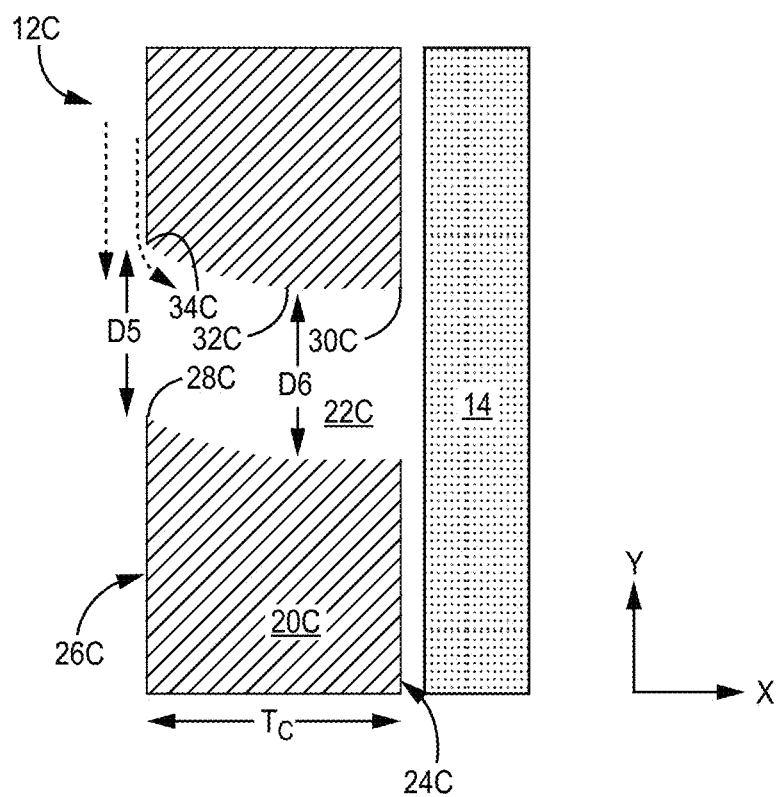
FIG. 2C is a simplified cross-sectional illustration of a tooling fixture with infiltration holes according to a third embodiment.

FIGS. 2A, 2B, and 2C are simplified enlarged cross-sectional illustrations of alternative infiltration holes 22A, 22B, and 22C, respectively, for a tooling fixture. FIGS. 2A, 2B, and 2C are discussed together.

FIG. 2A illustrates a portion of side 20A of tooling fixture 12A, oriented along the y-axis. Tooling fixture 12A includes inner (i.e., preform-facing) surface 24A, oppositely disposed outer surface 26A, and thickness TA extending therebetween. Thickness TA need not be uniform across the entirety of tooling fixture 12A, although FIG. 2A depicts a section of uniform thickness. Each hole 22A includes inlet 28A at outer surface 26A and outlet 30A at inner surface 24A. Reactant gas travels through tooling fixture 12A in an inlet-to-outlet direction during CVI. Hole 22A can include an inlet portion extending between inlet 28A and transition point 32A, and an outlet portion extending between transition point 32A and outlet 30A. Hole 22A has a frustoconical three-dimensional geometry between inlet 28A and transition point 32A (i.e., inlet portion) forming a trapezoidal cross-sectional area (i.e., the plane visible in FIG. 2A). Hole 22A transitions to a cylindrical three-dimensional geometry at transition point 32A, forming a rectangular cross-sectional area between transition point 32A and outlet 30A (i.e., outlet portion). Accordingly, hole 22A has a first diameter D1 at inlet 28A which tapers linearly to transition point 32A, and a uniform second diameter D1 between transition point 32A and outlet 30A. D1 is the largest diameter of hole 22A, and D1>D2. In an exemplary embodiment, D2 can be 0.125 in, and D1 can be 0.131 in to 0.25 in. Corners 34A are formed where inlet 28A meets outer surface 26A. The frustoconical geometry at inlet 28A forms a reduced (i.e., <) 90° open angle (FIG. 3) at the upstream/upper corner 34A with respect to the y-axis and the flow of reactant gas, which reduces pressure loss through hole 22A. More specifically, the pressure drop coefficient $K_L$ for the frustoconical geometry can be lower than for a conical hole forming a right angle at outer surface 26A.

FIG. 2B illustrates a portion wall 20B of tooling fixture 12B which is substantially similar to wall 20A, having inner surface 24B, outer surface 26B and thickness TB extending therebetween. Hole 22B can include an inlet portion extending between inlet 28B and transition point 32B, and an outlet portion extending between transition point 32B and outlet 30B. Wall 20B differs from wall 20B in that hole 22B has a frustoconical bell mouth three-dimensional geometry (i.e., having an at least partially convexly curved segment) from inlet 28B to transition point 32B, and thereafter has a cylindrical three-dimensional geometry. Hole 22B has a first diameter D3 at inlet 28B which curvilinearly tapers to transition point 32B, and a uniform second diameter D4 between transition point 32B and outlet 30B. D3 is the largest diameter of hole 22B, and D3>D4. In an exemplary embodiment, D4 can be 0.125 in, and D3 can be 0.131 in to 0.25 in. Corners 34B are formed where inlet 28B meets outer surface 26B. Corners 34B have non-right angles, with the upstream corner being greater than 90°. In addition to being non-right angles, corners 34B are also curved which can help further minimize pressure losses compared to hole 22A, in some cases achieving a lower $K_L$ value than hole 22A under similar CVI conditions. In an alternative embodiment, hole 22B can have more of a parabolic three-dimensional geometry with concave curvature between inlet 28B and transition point 32B.

FIG. 2C illustrates a portion of wall 20C of tooling fixture 12C which is substantially similar to walls 20A and 20B, having inner surface 24C, outer surface 26C and thickness Tc extending therebetween. Hole 22C can include an inlet portion extending between inlet 28C and transition point 32C, and an outlet portion extending between transition point 32C and outlet 30C. Wall 20C differs from walls 20A and 20B in that hole 22C is directionally angled toward the flow of reactant gas, with a bell mouth shaped upstream corner 34C and a pointed downstream corner 34C. The geometry transitions to a cylinder, oriented along the x-axis at transition point 32C. Hole 22C has a first diameter D5 at inlet 28C which can be slightly larger, depending on the curvature, than the remaining diameter of the angled segment (i.e., upstream of transition point 32C) which otherwise remains fairly uniform between inlet 28C and transition point 32C. Hole 22C further includes second diameter D6, which is uniform between transition point 32C and outlet 30C. Depending on the embodiment, D5>D6, or D5=D6. D6 can be 0.125 in. Corners 34C are formed where inlet 28C meets outer surface 26C. Corners 34C have non-right angles, with the upstream corner being greater than 90°. Angling inlet 28C in the flow direction eliminates right angles, and further rounding upstream corner 34C can reduce pressure losses in the same manner as the preceding examples.

Figure 3:
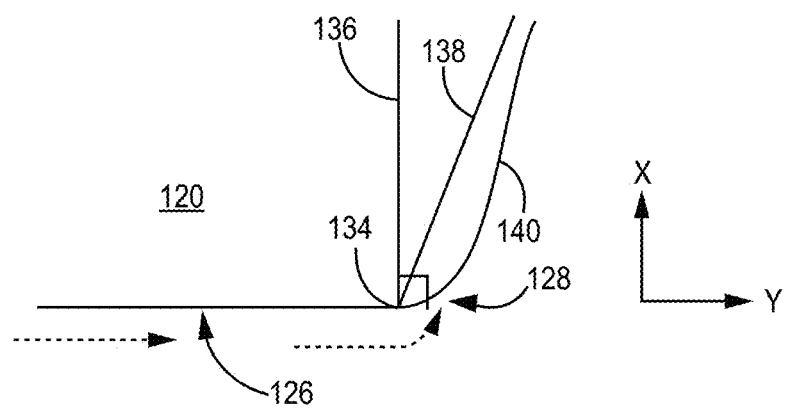
FIG. 3 is a simplified illustration comparing the angles of the upstream corner of various infiltrations holes of FIGS. 2A-2C.

FIG. 3 is a simplified illustration of a portion of wall 120 showing upstream corner 134, based on the direction of flow of reactant gases (represented as dashed arrows) along the y-axis. Corner 134 is formed where outer surface 126 of wall 120 meets inlet 128. Line 136 represents the inner surface of a cylindrical hole, forming a 90° open angle at corner 134. Line 138 represents the inner surface of a hole (i.e., hole 22A) with a frustoconical geometry at the inlet portion, such that the inner surface forms an open angle at corner 134 that is less than 90°. Similarly, line 140 represents the inner surface of a hole (i.e., hole 22B or 22C) with a curved/bell mouth inner surface also forming open angle at corner 134 that is less than 90°.

Any of holes 22A, 22B, and/or 22C can be included in a single wall and/or tooling fixture and/or combined with cylindrical holes depending on preform characteristics and/or placement of the tooling fixture within the CVI reactor. For example, holes 22A, 22B, and/or 22C can be formed in walls expected to be parallel to the flow of reactant gas. They can also be formed in tooling fixture walls/locations aligned with a local preform thickness that is relatively thick, or in locations situated further from the reactant gas injection site/inlet where the concentration becomes more depleted. Holes 22A, 22B, and 22C can be formed using a laser or mechanical drilling technique, including countersinking for frustoconical sections, and trepanning for curved and/or bell mouth inlets. The disclosed tooling fixtures can be used to form CMC components for aerospace, maritime, or industrial equipment, to name a few, non-limiting examples.

DISCUSSION OF POSSIBLE EMBODIMENTS

The following are non-exclusive descriptions of possible embodiments of the present invention.

A tooling fixture suitable for use in infiltrating a fibrous preform with a flow of reactant gas includes at least one wall. The at least one wall includes an outer surface and opposing inner surface defining a thickness therebetween, and a plurality of holes extending through the thickness. Each hole of the plurality of holes includes an inlet at the outer surface, an outlet at the inner surface, a transition point between the inlet and the outlet, and a first corner defined by the outer surface and the inlet. An angle of the first corner is greater than 90 degrees, each hole of the plurality of holes has a first diameter at the inlet and a second diameter at the outlet, and the second diameter is less than the first diameter.

The tooling fixture of the preceding paragraph can optionally include, additionally and/or alternatively, any one or more of the following features, configurations and/or additional components:

In the above tooling fixture, the first corner can be rounded.

In any of the above tooling fixtures, each hole of the plurality of holes can further include a frustoconical bell mouth geometry between the inlet and the transition point, and a cylindrical geometry between the transition point and the outlet.

In any of the above tooling fixtures, each hole of the plurality of holes can further include an angled geometry between the inlet and the transition point, and a cylindrical geometry between the transition point and the outlet.

In any of the above tooling fixtures, each hole of the plurality of holes can further include a frustoconical geometry between the inlet and the transition point, and a cylindrical geometry between the transition point and the outlet.

In any of the above tooling fixtures, the at least one wall can be disposed along a flow axis of the reactant gas.

In any of the above tooling fixtures, the tooling fixture can be formed from at least one of graphite, a refractory metal alloy, a carbon-carbon composite, and a ceramic material.

A tooling fixture suitable for use in infiltrating a fibrous preform with a flow of reactant gas includes at least one wall. The at least one wall includes an outer surface and opposing inner surface defining a thickness therebetween, and a plurality of holes extending through the thickness. Each hole of the plurality of holes includes an inlet at the outer surface, an outlet at the inner surface, a transition point between the inlet and the outlet, and a first corner defined by the outer surface and the inlet. An angle of the first corner is greater than 90 degrees.

The tooling fixture of the preceding paragraph can optionally include, additionally and/or alternatively, any one or more of the following features, configurations and/or additional components:

In the above tooling fixture, the first corner can be rounded.

Any of the above tooling fixtures can further include a second corner defined by the outer surface and the inlet.

In any of the above tooling fixtures, the second corner can be rounded.

In any of the above tooling fixtures, each hole of the plurality of holes can further include a frustoconical bell mouth geometry between the inlet and the transition point, and a cylindrical geometry between the transition point and the outlet.

In any of the above tooling fixtures, each hole of the plurality of holes can further include a first diameter at the inlet, and a uniform second diameter from the transition point to the outlet. The first diameter can be greater than the second diameter.

In any of the above tooling fixtures, each hole of the plurality of holes can further include an angled geometry between the inlet and the transition point, and a cylindrical geometry between the transition point and the outlet.

In any of the above tooling fixtures, each hole of the plurality of holes can further include a first diameter at the inlet, and a uniform second diameter from the transition point to the outlet. The first diameter can be greater than the second diameter.

In any of the above tooling fixtures, each hole of the plurality of holes can further include a frustoconical geometry between the inlet and the transition point, and a cylindrical geometry between the transition point and the outlet.

In any of the above tooling fixtures, each hole of the plurality of holes can further include a first diameter at the inlet, and a uniform second diameter from the transition point to the outlet. The first diameter can be greater than the second diameter.

In any of the above tooling fixtures, the at least one wall can be disposed along a flow axis of the reactant gas.

Any of the above tooling fixtures can further include a second wall disposed orthogonal or parallel to the at least one wall.

In any of the above tooling fixtures, the tooling fixture can be formed from at least one of graphite, a refractory metal alloy, a carbon-carbon composite, and a ceramic material.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A tooling fixture suitable for use in infiltrating a fibrous preform with a flow of reactant gas, the tooling fixture comprising:
    a plurality of walls arranged to define an enclosure for a fibrous preform, each of the plurality of walls comprising:
        an outer surface and opposing inner surface defining a thickness therebetween, the inner surface disposed to face the fibrous preform; and
        a plurality of holes extending through the thickness of at least a first wall of the plurality of walls, each hole of the plurality of holes comprising:
            an inlet at the outer surface;
            an outlet at the inner surface; and
            a transition point between the inlet and the outlet;
        wherein the outer surface transitions into the inlet via a first corner;
        wherein an angle of the first corner is greater than 90 degrees;
        wherein each hole of the plurality of holes has a first diameter at the inlet and a second diameter at the outlet; and
        wherein the second diameter is less than the first diameter.

2. The tooling fixture of claim 1, wherein the first corner is rounded.

3. The tooling fixture of claim 2, wherein each hole of the plurality of holes further comprises:
    a frustoconical bell mouth geometry between the inlet and the transition point; and
    a cylindrical geometry between the transition point and the outlet.

4. The tooling fixture of claim 2, wherein each hole of the plurality of holes extend at a non-orthogonal angle relative to the outer surface between the inlet and the transition point and extend orthogonally relative to the inner surface between the transition point and the outlet.

5. The tooling fixture of claim 1, wherein each hole of the plurality of holes further comprises:
    a frustoconical geometry between the inlet and the transition point; and a cylindrical geometry between the transition point and the outlet.

6. A chemical vapor infiltration reactor containing the tooling fixture of claim 1, wherein the first wall extends parallel to a flow axis of the reactant gas.

7. The tooling fixture of claim 1, wherein the tooling fixture is formed from at least one of graphite, a refractory metal alloy, a carbon-carbon composite, and a ceramic material.

8. The tooling fixture of claim 1, wherein each of the plurality of holes further comprises a second corner opposite the first corner over which the outer surface transitions into the inlet, wherein the second corner is less than 90 degrees.

9. A tooling fixture suitable for use in infiltrating a fibrous preform with a flow of reactant gas, the tooling fixture comprising:
- a plurality of walls arranged to define an enclosure for a fibrous preform, each of the plurality of walls comprising:
  - an outer surface and opposing inner surface defining a thickness therebetween, the inner surface disposed to face the fibrous preform; and
  - a plurality of holes extending through the thickness of at least a first wall of the plurality of walls, each hole of the plurality of holes comprising:
    - an inlet at the outer surface;
    - an outlet at the inner surface; and
    - a transition point between the inlet and the outer surface;
  - wherein the outer surface transitions into the inlet via a first corner;
  - wherein an angle of the first corner is less-greater than 90 degrees.

10. The tooling fixture of claim 9, wherein the first corner is rounded.

11. The tooling fixture of claim 10, wherein the plurality of holes further comprise a second corner defined by the outer surface and the inlet, wherein the second corner is rounded.

12. The tooling fixture of claim 10, wherein each hole of the plurality of holes further comprises:
- a frustoconical bell mouth geometry between the inlet and the transition point; and
- a cylindrical geometry between the transition point and the outlet.

13. The tooling fixture of claim 12, wherein each hole of the plurality of holes further comprises:
- a first diameter at the inlet; and
- a uniform second diameter from the transition point to the outlet;
- wherein the first diameter is greater than the second diameter.

14. The tooling fixture of claim 10, wherein each hole of the plurality of holes extend at a non-orthogonal angle relative to the outer surface between the inlet and the transition point and extend orthogonally relative to the inner surface between the transition point and the outlet.

15. The tooling fixture of claim 14, wherein each hole of the plurality of holes further comprises:
- a first diameter at the inlet; and
- a uniform second diameter from the transition point to the outlet;
- wherein the first diameter is greater than the second diameter.

16. The tooling fixture of claim 9, wherein each hole of the plurality of holes further comprises:
- a frustoconical geometry between the inlet and the transition point; and
- a cylindrical geometry between the transition point and the outlet.

17. The tooling fixture of claim 16, wherein each hole of the plurality of holes further comprises:
- a first diameter at the inlet; and
- a uniform second diameter from the transition point to the outlet;
- wherein the first diameter is greater than the second diameter.

18. The tooling fixture of claim 9, wherein a second wall of the plurality of walls extends orthogonal to the first wall.

19. The tooling fixture of claim 18, wherein a second wall of the plurality of walls is disposed parallel to the first wall and spaced from the first wall defining the enclosure therebetween, wherein the second wall comprises the plurality of holes extending through the thickness.

20. The tooling fixture of claim 9, wherein each of the plurality of holes further comprises a second corner opposite the first corner over which the outer surface transitions into the inlet, wherein the second corner is less than 90 degrees.

* * * * *